ered cooling liquid passages in the cylinder head and the reference character 13 a liquid cooling radiator with cooling liquid inlet and outlet fittings 14 and 15. On the cylinder head there is provided a cooling liquid outlet spout 16 which communicates with the cooling liquid passages in the cylinder head and to which is secured by screws 17 a cooling liquid outlet fitting 18. The cooling liquid outlet fitting 18 is connected to the radiator inlet fitting by a length of hose 19. The radiator outlet fitting 15 is connected by another length of hose 20 to the cooling liquid inlet fitting 21 of an engine driven cooling liquid pump 22 which is mounted on the front of the cylinder block with its outlet communicating with the cooling liquid passages in the cylinder block.

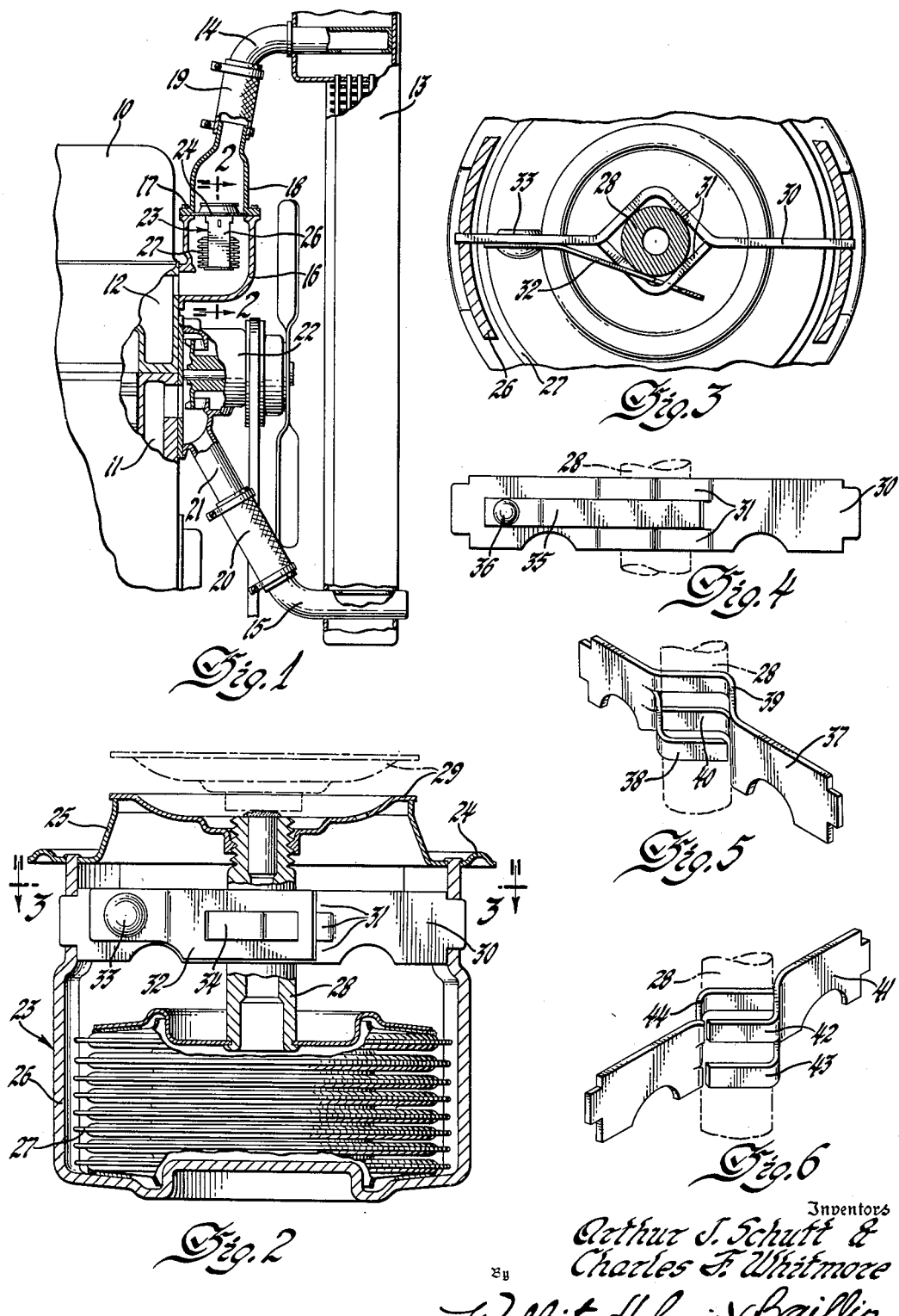

2,735,619

THERMOSTAT FOR ENGINE COOLING SYSTEMS

Arthur J. Schutt and Charles F. Whitmore, Lockport, N. Y., assignors to General Motors Corporation, Detroit, Mich., a corporation of Delaware Application January 14, 1950, Serial No. 138,582

9 Claims. (Cl. 236—34)

This invention has to do with liquid cooling systems for internal combustion engines, especially the propelling engines of automotive vehicles.

Liquid cooling systems of the type with which this invention is concerned include the engine cooling liquid jacket, a liquid cooling radiator, conduits which conduct the cooling liquid from the engine jacket to the radiator and back to the engine jacket and a bellows thermostat in one of the conduits to control the circulation of the cooling liquid through the engine jacket and the radiator.

Bellows thermostats employed in this environment have been found to rupture more quickly and frequently than was to be anticipated from the apparent condition of service, taking into account the high quality of the thermostats employed. What the fundamental cause of this difficulty is is not altogether clear but it is apparently connected with the presence of air in the cooling liquid, the temperature, pressure and velocity of the cooling liquid and the presence in the cooling system of restriction on the downstream side of the thermostat. The restriction is apparently an important factor since bellows thermostats rupture more quickly and frequently in cooling systems in which the restriction is relatively high than in cooling systems in which it is relatively low. The factors mentioned or some phenomenon connected with them induce vibrations of high frequency in the bellows and these high frequency vibrations are apparently the cause of the rupture of the bellows. Under extreme conditions it has been found that the bellows rupture in an almost unbelievably short period of time, in a matter of a few seconds.

This invention resides in a bellows thermostat which is so constructed as to obviate the difficulty referred to and in engine cooling systems of the type described with such thermostats in them. More specifically, the invention resides in a bellows thermostat in which is incorporated means to inhibit induction of high frequency vibrations in the bellows without considerably interfering movement of the bellows in response to temperature changes and in engine cooling systems of the type described with such thermostats in them.

For a better understanding of the nature and objects of this invention reference is made to the following specification and the accompanying drawing wherein embodiments of our invention are described and illustrated.

In the accompanying drawing:

Figure 1 is a side elevation, with parts in section, of a portion of an automotive vehicle internal combustion propelling engine equipped with a cooling system in accordance with our invention.

Figure 2 is an enlarged sectional view of the thermostat included in the cooling system illustrated in Figure 1 taken as indicated by the line 2—2 in Figure 1.

Figure 3 is a fragmentary section taken as indicated by the line 3—3 in Figure 2.

Figures 4, 5 and 6 are views of modified forms of valve stem guides and dampers for the thermostat shown in the preceding figures.

In the drawing, the reference character 10 indicates an internal combustion engine with cooling liquid passages 11 and 12 in its cylinder block and cylinder head and the reference character 13 a liquid cooling radiator with cooling liquid inlet and outlet fittings 14 and 15. On the cylinder head there is provided a cooling liquid outlet spout 16 which communicates with the cooling liquid passages in the cylinder head and to which is secured by screws 17 a cooling liquid outlet fitting 18. The cooling liquid outlet fitting 18 is connected to the radiator inlet fitting by a length of hose 19. The radiator outlet fitting 15 is connected by another length of hose 20 to the cooling liquid inlet fitting 21 of an engine driven cooling liquid pump 22 which is mounted on the front of the cylinder block with its outlet communicating with the cooling liquid passages in the cylinder block.

The reference character 23 indicates a thermostat which includes an annular element 24 whose outer edge is clamped between the cooling liquid outlet fitting 18 and the spout 16 and on whose inner edge there is formed an upstanding generally frusto-conical flange 25. To the annular element 24 there are secured the extremities of the legs of a stirrup-like element 26 which extends downwardly into the spout 16. To the base of the stirrup 26 there is secured one end of a metal bellows 27 which contains a volatile liquid. To the free end of the bellows 27 through the intermediary of a stem 28 which extends into the opening in the annular element 24, there is secured a generally disc-like valve element 29 which is located on the side of the annular element opposite that on which the bellows and stirrup are located. The valve element seats on the flange 25 on the annular element 24 when the bellows is collapsed and is spaced from it when the bellows is expanded. Between the legs of the stirrup 26 above the bellows 27, there extends a strip 30 whose ends are anchored in the legs of the stirrup with the greater transverse dimension of the strip in a vertical plane. The intermediate portion of the strip is separated into three fillets 31 by longitudinal slits. The upper and lower fillets are offset to one and the intermediate fillet to the other side of the plane of the strip to define an opening through which the valve stem 28 extends. The fillets limit lateral movement of and thus serve as a guide for the valve stem.

When the engine 10 is operating, the cooling liquid pump 22, of course, tends to draw cooling liquid from the radiator 13 and force it through the cylinder block and cylinder head cooling liquid jackets 11 and 12 back into the radiator. However, when the cooling liquid is cold the thermostat 23 prevents this circulation and thus promotes rapidly bringing the engine up to the desired operating temperature. When the cooling liquid becomes warmer the valve 29 opens and cooling liquid is circulated through the indicated circuit with the result that the temperature of the engine is prevented from exceeding the desired operating value.

The outlet fitting 18, the hose 19 and the radiator inlet fitting 14, of course, constitute a relative restriction in the cooling liquid circuit on the downstream side of the thermostat 23 which, as we have said, directly or by some phenomenon connected with it and the presence of air in the cooling liquid and the temperature, pressure and velocity of the cooling liquid tends to induce high frequency vibrations in the bellows 27. To prevent the induction of these high frequency vibrations in the bellows without interfering considerably with movement of the bellows in response to changes in temperature of the cooling liquid, there is provided a leaf spring 32. One end of the leaf spring 32 is secured to the valve stem guide 30 by a rivet 33 and the other bears against the valve stem 28 and holds it against the upper and lower fillets 31 on the valve stem guide. The last mentioned end of the spring 32 has in it a rectangular opening 34 through which the intermediate fillet 31 extends so that it prevents the spring swinging on the rivet 33. The friction between the spring 32 and the upper and lower fillets 31 and the valve stem is made sufficient to prevent induction of high frequency vibrations in the bellows but insufficient to interfere considerably with movement of the bellows in response to temperature changes. This expedient has proved eminently successful in preventing the rupture of the bellows of thermostats which are installed in the environment described and illustrated in the drawing.

Modifications of this expedient are, of course, possible. That shown in Figure 4 consists of a leaf spring 35 of which one end is secured by a rivet 36 to a valve stem guide 30 which is identical with the valve stem guide 30 shown in the preceding figures. The other end of the leaf spring 35 extends between the upper and lower fillets 31 on the valve stem guide and bears against the valve stem 28 and holds it against the intermediate fillet on the guide.

The valve stem guide 37 shown in Figure 5 is similar to that shown in the preceding figures except in that one end of the intermediate fillet 38 is disconnected from the body of the guide and serves as a spring which bears against the valve stem 28 and holds it against the upper and lower fillets 39 and 40.

The valve stem guide 41 shown in Figure 6 is similar to that shown in Figures 1 to 4 except in that one end of each of the upper and lower fillets 42 and 43 is disconnected from the body of the guide and serve as a spring which bears against the valve stem 28 and hold it against the intermediate fillet 44.

We claim:

1. In a thermostat, a bellows, a valve, a stem connecting the valve to the bellows, a guide for said stem comprising a transverse member having spaced means formed thereon engaging said stem at axially spaced portions at one side thereof and an additional portion engaging said stem at the opposite side of the latter, and leaf spring means carried by said guide and disposed transversely of and engaging said stem at one or more points on the said opposite side thereof to inhibit the induction of vibrations in said bellows.

2. In a thermostat, a bellows, a valve, a stem connecting the valve to the bellows, a guide for said stem comprising a transverse member having spaced means formed thereon engaging said stem at axially spaced portions at one side thereof and an additional portion engaging said stem at the opposite side of the latter at points thereon disposed between the points of contact of said spaced portions, and leaf spring means carried by said guide and engaging said stem for inhibiting vibrations in said bellows, said leaf spring havng a slot for receiving said additional portion and resiliently engaging said stem at spaced points disposed at opposite sides of said additional portion.

3. In a thermostat, a bellows, a valve, a stem which connects the valve to the bellows, a guide with a portion on one side and spaced portions on the other side of the stem, and a leaf spring which is secured to the guide and contacts the stem between the spaced portions of the guide and inhibits induction of vibrations in the bellows.

4. In a thermostat, a bellows, a valve, a stem connecting the valve to the bellows, a relatively narrow guide member for said stem extending transversely of the latter and being disposed intermediate said valve and bellows, and means to inhibit the induction of the vibrations in the bellows, said last mentioned means comprising leaf spring means carried by said guide member and disposed transversely of and constantly engaging said stem, and said leaf spring lying within the narrow confines of said guide member.

5. The thermostat claimed in claim 4 wherein said leaf spring means are formed integrally on said guide member and engages said stem at spaced points thereon.

6. The thermostat claimed in claim 4 wherein said leaf spring means are formed integrally on said guide member and engages said stem at axially spaced points thereon.

7. The thermostat claimed in claim 4 wherein said leaf spring means are integral with said guide and resiliently engage said stem at axially and circumferentially spaced points.

8. The thermostat claimed in claim 6 wherein one end of said leaf spring means is disconnected from said guide.

9. The thermostat claimed in claim 7 wherein one end of said leaf spring means is disconnected from said guide.

References Cited in the file of this patent

UNITED STATES PATENTS

| | | |
|---|---|---|
| 1,354,740 | Giesler | Oct. 5, 1920 |
| 1,737,103 | Wilson | Nov. 26, 1929 |
| 1,784,058 | Giesler | Dec. 9, 1930 |
| 2,249,101 | Wile | July 15, 1941 |
| 2,435,675 | Curtis | Feb. 10, 1948 |
| 2,468,735 | Brubaker | May 3, 1949 |